April 26, 1938.  D. R. SCHOLES  2,115,286
POWER TRANSMITTING MECHANISM
Original Filed Dec. 29, 1933
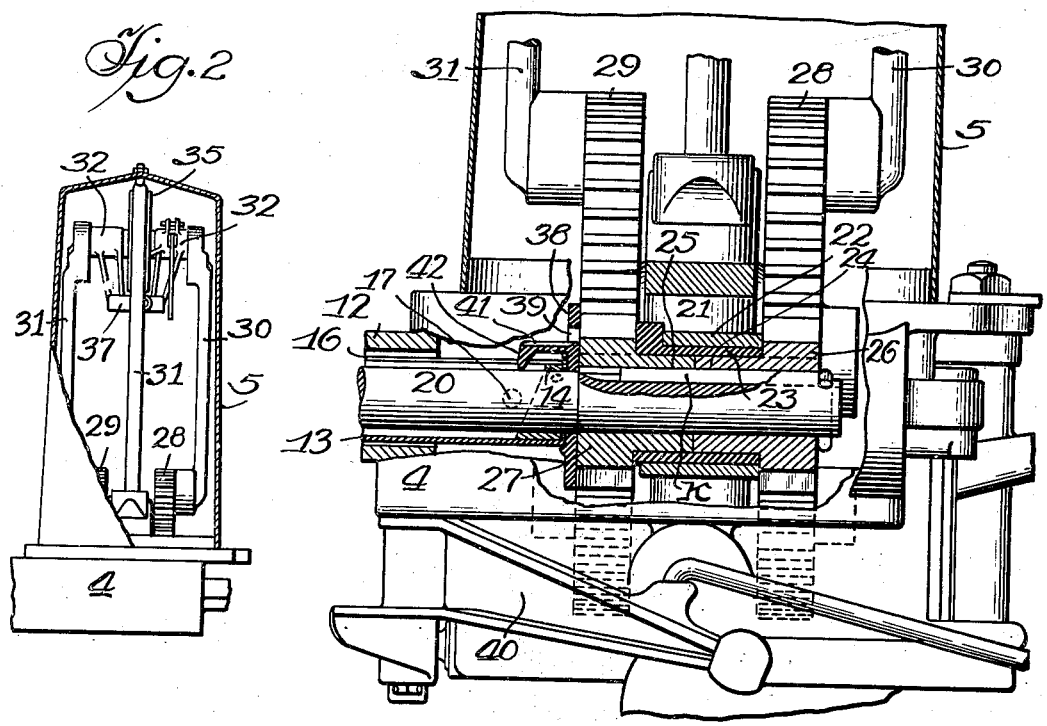
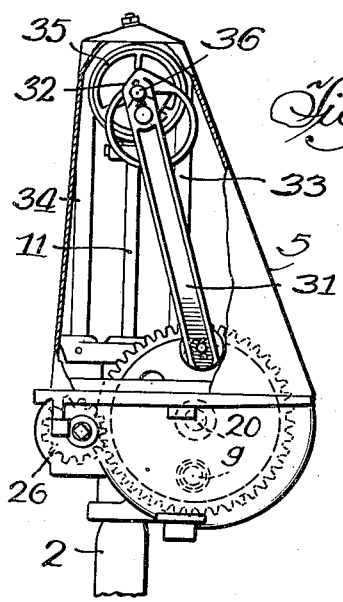
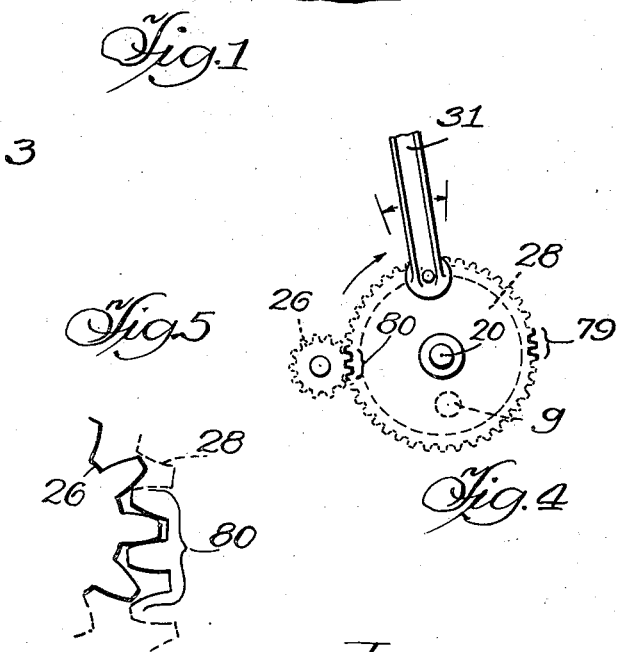
Witness:
Chas. R. Toursh
Inventor,
By Daniel R. Scholes,
Parkinson + Lane, Attys Patented Apr. 26, 1938

2,115,286

UNITED STATES PATENT OFFICE 2,115,286

POWER TRANSMITTING MECHANISM

Daniel R. Scholes, Oak Park, Ill., assignor to Aermotor Company, Chicago, Ill., a corporation of Illinois Original application December 29, 1933, Serial No. 704,428. Divided and this application April 12, 1935, Serial No. 15,996

11 Claims. (Cl. 74—44)

This invention relates to power transmitting mechanism and more particularly to such mechanism for transmitting power in windmill construction. This application is a division of my application Serial No. 704,428, filed December 29, 1933.

One of the objects of this invention is to provide improved mechanism for transmitting power and is shown as applied for converting rotary motion to reciprocatory motion.

A further object is to provide in windmill construction an improved main frame with a bored bearing socket, together with improved means for rotatably mounting driving pinions therein.

A still further object is to provide in windmill construction pinions with hubs forming journals.

A further object is to provide in windmill construction gears having enlarged teeth at predetermined spaced points around the circumference of the gears, whereby the enlarged teeth will come into contact with pinion teeth at the points of reversal of pressure on the pump rod to prevent backlash.

Another object is to provide in windmill construction pinions having accurately formed teeth and driven gears with teeth not so accurately formed but having enlarged teeth at the points of reversal of pressure to prevent backlash at such points.

Other objects, advantages and capabilities will later more fully appear.

My invention further resides in the combination, construction and arrangement of parts shown in the accompanying drawing, and while I have illustrated therein preferred embodiments it is to be understood that the same are susceptible of modification and change without departing from the spirit of my invention.

In the drawing:—

Fig. 1 is a vertical longitudinal section taken on a vertical plane passing through the axis of the windmill shaft, parts being shown in elevation and parts being broken away for convenience.

Fig. 2 is a view partly in section and partly in elevation of a windmill hood or helmet and mechanism therein.

Fig. 3 is a side elevation partly in section of the parts shown in Fig. 2.

Fig. 4 is a side elevation of the driving pinions and associated gears, and showing in solid lines certain teeth of the gears, said teeth being spaced predetermined distances and enlarged to prevent backlash at the points of reversal of pressure on the pump rod, the other teeth of the gears and pinions being shown in dotted lines.

Fig. 5 is a fragmentary elevation of a portion of the teeth of the driving pinion having intermeshed therewith the enlarged teeth of the associated gears.

Referring in detail to the drawing and describing the invention for use in connection with a windmill, the mill proper, as will be understood, is operatively mounted at the top of the windmill tower. Mounted at the top of the tower is the pipe 2, upon which is rotatably mounted the driving mechanism and the wind wheel (not shown). The driving mechanism is operatively mounted within the casing 4 and hood or helmet 5. Casing 4 houses the gearing mechanism shown more in detail in Figs. 1, 2 and 3, and extending laterally from this gear casing 4 is the hollow laterally extending member 12, in which is fixedly mounted the metallic tubular member 13 having in its right-hand end the oil seal bearing 14 formed of Babbitt metal or other suitable bearing material. This tubular member 13 is described more in detail in my copending parent application Serial No. 704,428 referred to hereinabove. The right-hand edge of oil seal bearing 14 is vertical, while the left-hand edge is formed on an inclination, just to the left of which is the opening 17 which is formed in the side of the hollow tubular member 13 at a predetermined height to determine the oil level in the tubular member 13.

The wind wheel shaft 20 is rotatably mounted in bearing 14, and another bearing (not shown) in the outer left-hand end of tubular member 13, the right-hand end of this shaft 20 extending into the gear casing 4 in a suitable bearing in that portion 21 of the main frame positioned within the gear casing, the portion 21 of the main frame being formed with the tubular portion 22 which is bored to receive the bearing 23 of Babbitt metal or other suitable material, in which bearing 23 are rotatably mounted the inwardly extending hubs 24 and 25 of the driving pinions 26 and 27, which pinions are keyed by key K to shaft 20.

Meshing with driving pinions 26 and 27 are the driving gears 28 and 29, respectively, each of which driving gears is provided with a crank boss for rotatably connecting the lower end of the pitmans 30 and 31 to the driving gears, there being on the outer face of each of these driving gears 28 and 29 two of these crank bosses positioned at different distances from the axis of the driving gears 28 and 29, in order that the throw of the pitmans may be changed as desired to effect a greater or less reciprocation of the cross-head 32, with which cross-head the upper end of each of the pitmans 30 and 31 is connected.

Fixed in the main frame are the stationary guide rods 33 and 34 (which are preferably formed from one piece of metal), in which guide rods is guided for longitudinal reciprocation the anti-friction wheel 35, which is rotatably mounted on the shaft 36 of the cross-head 32. Suitably secured to the lower end 37 of cross-head 32 is the pump rod 11, which is connected to the pump pole (not shown) for imparting a vertical reciprocation thereto. As will be understood, the pump pole is at its lower end secured in any desired manner to a pump mechanism to be operated by the windmill.

Loosely mounted on shaft 20 but fixed against rotation with relation to tubular member 13, is the oil delivering disk or plate 38, one face of which bears loosely against the left-hand face of pinion 27, the disk or plate 38 being formed with a cutaway portion 39, the edges of which collect oil carried upwardly by the teeth of gear wheel 29 from the oil bath in the bottom 40 of the gear casing 4, and which oil is transferred from said teeth to the pinion 27. This oil which is carried up by the teeth of gear wheel 29 and wiped from the face of pinion 27 by the edges of opening 39 in the oil conveying disk 38 and other parts of the disk, is conveyed through trough 41 and down lip 42 through the slot 16 in the top of tubular member 13 and down into the interior of this tubular member. When the oil conveyed into the inside of tubular member 13 reaches a sufficient height it will flow through opening 17 and back into the oil bath in gear casing 4, as described in my said copending application Serial No. 704,428.

From the above it will be seen that the bearings of the driving pinions 26 and 27, as well as the bearings of gears 28 and 29 and the bearings of the crank bosses at the lower ends of the pitmans 30 and 31, and any other parts needing lubrication within the gear casing, will be thoroughly lubricated, and oil will be fed into tubular member 13 by disk or plate 38 described above. This oil inside of the tubular member 13 will flow to the bearings in tubular member 13, as described in my copending application Serial No. 704,428 referred to above.

When the cross-head 32 reaches the upper limit of its travel, the lower end of the pitmans 30 and 31 will pass through the upper dead center of driving gears 28 and 29, and when the cross-head reaches the lower limit of its travel the lower end of pitmans 30 and 31 will pass through the lower dead center of these driving gears. These dead centers, as will be understood, are those positions of the pivotal center of the crank bosses to which the lower end of the pitmans are connected when this pivotal center falls on a line passing through the longitudinal axis of the pitmans and the center of rotation of the driving gear. If any backlash is present between the teeth of the driving gears and driving pinions there will be shock and noise when said crank bosses are passing through the dead center positions. In order to eliminate this shock and noise the driving pinions 26 and 27 are machined or otherwise formed to have accurate teeth, and those portions of the teeth of the driving gears 28 and 29 which are in mesh with the teeth of the driving pinions at the time the crank bosses are passing through the upper and lower dead center positions are made thicker so as to entirely eliminate any backlash at these dead center positions. These thickened portions are shown in Fig. 4 at 79 and 80, the latter being in mesh with the driving pinions when the crank bosses are passing through the upper dead center of the driving gears, and the teeth 79 being in mesh with the teeth of the driving pinions when these crank bosses are passing through the lower dead center position.

Fig. 4 shows the lower end of the pitmans as connected to the outer crank boss, that is, the one farthest away from the center of rotation of driving gears 28 and 29. An additional pair of crank bosses g positioned closer to the center of rotation of gears 28 and 29 are provided so that the lower end of the pitmans can be connected therewith when it is desired to shorten the stroke of the cross-head. In order to maintain this same relation between the enlarged teeth 79 and 80 and the teeth of the driving pinions 26 and 27, regardless of which set of crank bosses the lower end of the pitmans are connected with, the crank boss g on each gear 28 and 29 is positioned on the same diameter as the crank boss that is farthest away from the gear center. Also the thickened teeth 79 and 80 are so positioned on gears 28 and 29 that a diameter of said gears will pass through the central portions of these enlarged teeth and be at right angles to the diameter passing through both sets of crank bosses. This means that regardless of which set of the crank bosses the pitmans are connected with, the thickened teeth 79 and 80 will always come into play at the time the crank bosses and lower end of the pitmans are passing through at the dead center position. This prevents shock and noise at these positions of reversal of movement of the cross-head, and results in a much smoother and quieter operating mechanism.

In Fig. 4 the enlarged teeth 79 and 80 are shown in solid lines, while the remaining teeth of the gear 28 (the construction of gear 29 being the same) are shown in dotted lines for the sake of clearness. Fig. 5 shows the enlarged teeth 80 in mesh with the teeth of the driving pinions and shows the elimination of backlash.

From the above it will be seen that the enlarged teeth 79 and 80 of the gears 28 and 29 are positioned symmetrically with relation to a line passing through the centers of the two crank bosses of each gear and the center of the gear wheel 28 shown in Fig. 4 (the same applying to these parts on gear 29). In other words, the enlarged teeth 79 and 80 are symmetrical to the line coinciding with the longitudinal axis of pitmen 31 (and 30) and passing through the center of gear 28 and crank boss g. These enlarged teeth 79 and 80 may be during assembly filed or otherwise machined if desired to facilitate a more snug fit thereof in the spaces between these teeth and pinions 26 and 27.

Having now described my invention, I claim:

1. In windmill driving mechanism, a main frame, a bored bearing socket therein, a pair of separate pinions, a shaft, each pinion having a hub extending into said bearing socket but of a diameter smaller than the interior of the bearing socket to form a space between the hubs and the socket, a bearing filling the space between the bearing socket and the exterior of the said pinion hubs extending into the socket, each of said hubs being structurally separate from each other, each of said pinions and its hub being fixed to said shaft.

2. In windmill driving mechanism, a driving pinion having accurately formed teeth, a driven gear with teeth not so accurately formed, a cross-head, a pitman between said driven gear and said cross-head, said driven gear having enlarged teeth at such portions of its circumference as will engage the driving gear teeth at the points of reversal of pressure on the pitman whereby to prevent backlash at said points of reversal of pressure.

3. In windmill driving mechanism, a pinion with cut teeth, a driven gear with cast teeth, a cross-head, and pitmans connecting the cross-head with the driven gear, the teeth of the driven gear at those points which engage with the pinion at the time of reversal of pressure on the cross-head being enlarged to snugly fit the space between the teeth of the pinion to prevent backlash when the pressure on the cross-head is reversed at the two ends of its travel.

4. In windmill driving mechanism, a pinion with accurately formed teeth, a driven gear with cast teeth, a cross-head, a pitman connecting the cross-head with the driven gear, the said driven gear having two points of connection for said pitmans, said two points of connection being at different distances from the axis of rotation of said driven gear, the teeth of the driven gear at those points which engage with the pinion teeth at the time of reversal of pressure on the cross-head at the two ends of its stroke being enlarged to snugly fit the space between the teeth of the pinion to prevent backlash when the pressure on the cross-head is reversed, the two enlarged portions of the gear teeth being arranged symmetrically with relation to a line passing through the centers of said two points of connection and the center of rotation of the driven gear.

5. In windmill driving mechanism, a power shaft, a pair of separate pinions secured to said shaft, said pinions each having a hub portion extending toward and substantially touching a similar hub on the other pinion, said hub portions being structurally separate from each other and fixed to said shaft, a main frame having a bored bearing socket therein, and bearing material between the exterior of said hubs and the interior of said bored bearing socket.

6. In windmill driving mechanism, a pair of pinions each having a hub formed with an end extending toward and substantially touching the end of a similar hub on the other pinion, a gear casing having a bored bearing socket therein, and bearing material between the exterior of said hubs and the interior of said bored bearing socket.

7. In windmill driving mechanism, a driving pinion having accurately formed teeth, a driven gear having teeth not so accurately formed, reciprocating mechanism driven from said driven gear, the driven gear having enlarged teeth at such portions of its circumference as will engage the driving pinion teeth at the points of reversal of pressure of the reciprocating mechanism whereby to prevent backlash at said points of reversal of pressure, the enlarged teeth of one portion of the circumference being substantially 180 degrees from the enlarged teeth of the other portion of said circumference.

8. In windmill driving mechanism, a driving pinion having accurately formed teeth, a driven gear having the major portion of its teeth not so accurately formed, said driven gear having at two diametrically opposite points of its circumference enlarged teeth to prevent backlash between said pinion and gear when said enlarged teeth engage the accurately formed teeth of the pinion.

9. In windmill construction an enclosed casing containing mechanism for converting rotary motion to reciprocatory motion and means for preventing shock and noise at the points where the reciprocating parts change their direction of motion, said means comprising a driving pinion having accurately formed teeth and a driven gear having for the major portion of its circumference teeth not so accurately formed, said driven gear having at its circumferential points corresponding to those points when the direction of motion of the reciprocating parts change enlarged teeth to prevent backlash between said pinion and gear.

10. In windmill construction an enclosed casing containing mechanism for converting rotary motion to reciprocatory motion and means for preventing shock and noise at the points where the reciprocating parts change their direction of motion, said means comprising a driving pinion having accurately formed teeth and a driven gear having for the major portion of its circumference teeth not so accurately formed, said driven gear having at its circumferential points corresponding to those points when the direction of motion of the reciprocating parts changes enlarged teeth to prevent backlash between said pinion and gear, said circumferential points being diametrically opposite each other.

11. In windmill construction an enclosed casing containing mechanism for converting rotary motion to reciprocatory motion and means for preventing shock and noise at the points where the reciprocating parts change their direction of motion, said means comprising a driving pinion having accurately formed teeth and a driven gear having for the major portion of its circumference teeth not so accurately formed, said driven gear having at its circumferential points corresponding to those points when the direction of motion of the reciprocating parts changes enlarged teeth to prevent backlash between said pinion and gear, said circumferential points being diametrically opposite each other, a pitman connecting the driven gear with the reciprocating parts, and means for connecting one end of the pitman nearer to or farther away from the center of rotation of the driven gear, so as to vary the length of movement of the reciprocating parts as desired, the means for connecting the pitman at different distances from the center of the driven gear comprising crank bosses lying in a diameter at right angles to the diameter passing through the centers of the enlarged tooth portions.

DANIEL R. SCHOLES.

CERTIFICATE OF CORRECTION.

Patent No. 2,115,286.  April 26, 1938.

DANIEL R. SCHOLES.

It is hereby certified that error appears in the above numbered patent requiring correction as follows: In the grant, lines 2 and 13, name of assignee, for "Aeromotor Company" read Aermotor Company, as shown by the record of assignments in this office; and that the said Letters Patent should be read with this correction therein that the same may conform to the record of the case in the Patent Office.

Signed and sealed this 5th day of July, A. D. 1938.

Henry Van Arsdale,
Acting Commissioner of Patents.

(Seal)